United States Patent Office 3,043,825
Patented July 10, 1962

3,043,825
PROCESS FOR THE TREATMENT OF LOW PRESSURE POLYOLEFINES
Albert Frese, Franz Broich, and Paul Kränzlein, all of Marl, Kreis Recklinghausen, Germany, assignors to Chemische Werke Huls Aktiengesellschaft, Marl, Kreis Recklinghausen, Germany, a corporation of Germany
No Drawing. Filed Jan. 6, 1959, Ser. No. 785,120
Claims priority, application Germany Jan. 16, 1958
3 Claims. (Cl. 260—93.7)

The low pressure polyolefines made according to the Ziegler process must be freed during the processing thereof from catalyst residues consisting of chlorine-containing aluminum and titanium compounds. This may be done by washing with completely anhydrous alcohols and ketones. The drying and particularly the regeneration of these solvents is however difficult and expensive. According to other procedures the catalysts residues are removed by treatment with alcoholic or aqueous acid solutions, for example hydrochloric acid or sulfuric acid, or with complex formers, for example oxalic acid, lactic acid, tartaric acid, acetylactone, tetrahydrofuran, and others, in aqueous or alcoholic solution. These procedures have the drawback that all equipment must be protected against corrosion when the alcoholic and aqueous acids are used. The complex formers on the other hand are expensive compounds. In the alkaline processing of the crude low pressure polyolefines which has likewise been suggested, for example with aqueous sodium hydroxide, the aluminum component can be removed as sodium aluminate, but the titanium compounds can be dissolved out only in part, since the sodium titanate hydrolyses very easily.

It has been found that low pressure polyolefines according to Ziegler can be processed more advantageously if the crude low pressure polyolefine is treated in a first stage at 5 to 30° C. with a 15 to 40% aqueous solution of an easily soluble salt of a strong base and a strong acid, for example an alkali metal or an alkaline earth metal halide, an alkali metal sulfate or magnesium sulfate. The so-treated low pressure polyolefine is separated, re-washed with the aqueous salt solution and then treated in a second stage with a 3 to 10% aqueous sodium hydroxide solution and re-washed with water.

By low pressure polyolefines according to Ziegler we mean the polymerizates which can be obtained by polymerization of alpha-olefines under low pressure in the presence of mixed catalysts of titanium compounds etc. on the one hand and reducing agents, such as metallorganic compounds, in particular alkylaluminum halides on the other hand. The crude low pressure polyolefines which still contain catalyst residues can be used directly after separation of the diluent generally used in the polymerization, and washed in this form with the salt solution. It is however also possible to use the suspensions of the low pressure polyolefines produced in the polymerization directly without separation of the diluents. The diluents can then be separated in a simple manner from the consumed aqueous salt solutions and usually can be used again without further purification. When the suspension is used it is intensively mixed with the aqueous salt solution. After settling the aqueous salt solution can then be drawn off and the remaining suspension of the polyolefine in the diluent can be again washed with fresh salt solution, then with aqueous sodium hydroxide and finally with water. Finally the polyolefine is separated from the diluent and from the water on a suitable filtering device. It is also possible to separate the diluent after the treatment of the suspension with the aqueous salt solution together with the latter on a filtering device and then to wash the remaining polyolefine with aqueous sodium hydroxide and finally with water.

Easily soluble salts of strong bases with strong acids are suitable, for example the alkali metal and alkaline earth metal chlorides and bromides, the alkali metal sulfates and magnesium sulfate. Salts like sodium chloride, potassium chloride, ammonium chloride, magnesium chloride, sodium sulfate, ammonium sulfate and magnesium sulfate are preferably used in the form of their 15 to 30% aqueous solutions. If calcium or barium chloride is used as the treating salt, one will generally have to work with higher concentrations of 30 to 40%. If necessary the corresponding bromides can also be used in place of the chlorides. The aqueous salt solutions are used in the 1 to 10-fold quantity referred to the low pressure polyolefine. At temperatures between 5 and 30° C., preferably 15 to 25° C., they dissolve the titanium components of the catalyst residues as alkali metal or alkaline earth metal titanium double salt, particularly when they are allowed to act for 0.5 to 4 hours. The consumed solutions, which are separated, can be easily regenerated by heating to a temperature of 60 to 100° C. In this way the dissolved titanium compounds hydrolyze to titanium hydroxide which precipitates and is filtered off. After neutralization of the acid produced by the hydrolysis, and cooling to 5 to 25° C., the regenerated solutions can be used again.

The low pressure polyolefine, after removal of the bulk of the titanium components is re-washed with the 1 to 10-fold quantity of fresh salt solution and then treated in a second stage with a 1 to 10-fold quantity of 3 to 10% sodium hydroxide solution. If aqueous solutions of alkaline earth metal salts have been used, then one carries out a preliminary washing with water. The temperature in this treatment does not play the decisive role as in the treatment with the salt solution. For the sake of simplicity one will usually operate at room temperature but if necessary the temperature can be raised up to 80° C. The sodium hydroxide should expediently act for 0.5 to 4 hours. Then one separates and the low pressure polyolefine which is now freed of the titanium component as well as of the aluminum component of the catalyst residue is washed one or more times with a 1 to 10-fold quantity of water.

To the treatment liquids, particularly the washing water, but also to the sodium hydroxide and/or the aqueous salt solutions can be added small quantities of a surface-active substance, in order to improve the wetting of the low pressure polyolefine. As surface-active substances are used for example, ethoxylated fatty alcohols, ethoxylated alkylphenols, alkylarylsulfonates etc. in quantities of 0.01 to 1% by weight referred to the solution.

The low pressure polyolefine obtained is free of acid components and is distinguished by a low ash content of less than 0.05% in most cases and even less than 0.02% and yields particularly high grade products. The present procedure is simpler than those customary heretofore, since it permits the use of comparatively small quantities of inexpensive treatment liquids and requires no equipment that is corrosion resistant to acids or complex formers.

*Example 1*

One polymerizes 10,000 parts by weight of ethylene in 50,000 parts by weight of hexane in the presence of 100 parts by weight of titanium tetrachloride and 65 parts by weight of diethylaluminummonochloride at a temperature of 60° C. and a pressure of 1.2 absolute atmospheres. After conclusion of the polymerization the polyethylene suspension is cooled to 20° C. and 10,000 parts by weight of a 25% aqueous sodium chloride solution at 20° C. are added with stirring. The stirrer is stopped after 30 minutes and the sodium chloride solution, which is colored blue by the titanium compound, is separated. Then one re-washes in the same manner with 10,000 parts by weight of the 25% sodium chloride solution, subsequently with 10,000 parts by weight of a 5% sodium hydroxide at 20° C. and with 10,000 parts by weight of water. The purified polyethylene is separated from hexane and water on a centrifuge and washed with 10,000 parts by weight of water, to which are added 10 parts by weight of an ethoxylated hexadecylphenol, on the centrifuge. One thus obtains a polyethylene with a reduced viscosity of 1.9, with an ash content of 0.02%, which can be processed without difficulty.

Example 2

To a suspension of crude low pressure polyethylene in hexane obtained according to the data of example 1 are added at 25° C. with stirring 10,000 parts by weight of a 20% aqueous ammonium chloride solution at 25° C. After a period of action of 30 minutes the polymerisate is separated on a centrifuge and washed on the centrifuge with 10,000 parts by weight of a 20% aqueous ammonium chloride solution at 25° C., to which are added 5 parts by weight of an ethoxylated hexadecylphenol. The filter cake is washed with 40,000 parts by weight of a 5% aqueous sodium hydroxide solution, to which are added 15 parts by weight of an ethoxylated hexadecylphenol, at 50° C. Subsequently the polymersate is separated on a second centrifuge and washed with 20,000 parts by weight of water. One obtains a polyethylene with an ash content of 0.03%.

The titanium-containing alkali metal halide solution, after separation of the hexane, which can be used anew, is heated for one hour to 80° C., the precipitated titanium hydroxide is separated and the filtered solution is neutralized. After cooling to 20° C. the solution can be used again.

Example 3

One polymerises 5000 parts by weight of propylene in 20,000 parts by weight of heptane in the presence of 70 parts by weight of titanium trichloride and 60 parts by weight of aluminum triethyl at a temperature of 50° C. and a pressure of 1.5 absolute atmospheres. After conclusion of the polymerization one cools the polypropylene suspension to 20° C. and adds 5000 parts by weight of a 25% aqueous potassium chloride solution at 20° C. with stirring. The stirrer is stopped after 60 minutes and the titanium-containing potassium chloride solution is separated after being allowed to settle for 10 minutes. Then one washes in the same way a second time with 5000 parts by weight of the 25% potassium chloride solution, then 60 minutes with 5000 parts by weight of a 5% aqueous sodium hydroxide solution and with 10,000 parts by weight water. The polypropylene is separated from heptane and water on the centrifuge and washed with 10,000 parts by weight of water, to which are added 10 parts by weight of an ethoxylated dodecylphenol. One obtains a polypropylene with a reduced viscosity of 3.0 and with an ash content of 0.06%.

Example 4

One polymerises 1000 parts by weight of ethylene in 6000 parts by weight of isopropylcyclohexane in the presence of 10 parts by weight of titanium tetrachloride and 7 parts by weight of diisobutylaluminummonochloride at a temperature of 60° C. and a pressure of 3 absolute atmospheres. After conclusion of the polymerization one cools the polyethylene suspension to 25° C. and adds, with stirring, 3000 parts by weight of a 25% aqueous sodium bromide solution at 25° C. to which have been added 3 parts by weight of an ethoxylated fatty alcohol. The stirrer is stopped after one hour and the sodium bromide solution is separated after settling for 10 minutes. One then rewashes the polyethylene suspension in the same manner with 3000 parts by weight of the 25% aqueous sodium bromide solution, then with 3000 parts by weight of a 5% aqueous sodium hydroxide solution at 40° C. and with 3000 parts by weight of water. To the washing solutions and the water are, in each case, added 3 parts by weight of the ethoxylated fatty alcohol. The purified polyethylene is separated from isopropyl cyclohexane and water on a centrifuge and washed on the centrifuge with 10,000 parts by weight of water, to which have been added 10 parts by weight of an ethoxylated fatty alcohol. One obtains a polyethylene with a reduced viscosity of 2.0 with an ash content of 0.02%.

Example 5

To the suspension of crude low pressure polyethylene in isopropylcyclohexane obtained according to example 4 are added at 15° C. with stirring 3000 parts by weight of a 20% aqueous magnesium chloride solution at 15° C. The stirrer is stopped after one hour and the magnesium chloride solution is separated. Then one washes the polyethylene suspension in the same manner with 3000 parts by weight of the 20% aqueous magnesium chloride solution, then with 5000 parts by weight water, then with 3000 parts by weight of a 5% aqueous sodium hydroxide solution at 30° C. and then with 3000 parts by weight of water. The purified polyethylene is separated from isopropylcyclohexane and water on a centrifuge and washed to neutrality with 10,000 parts by weight of water on the centrifuge. One obtains a polyethylene with an ash content of 0.03%.

Example 6

The suspension of crude low pressure polyethylene in isopropylcyclohexane obtained according to the directions of Example 4 is separated into polyethylene and isopropylcyclohexane on a rotating filter. The filter cake is washed with 5000 parts by weight of a 35% aqueous calcium chloride solution at 15° C., to which are added 10 parts by weight of the sodium salt of an alkylbenzolsulfonic acid and stirred vigorously for one hour. Then the polymerisate is separated on a centrifuge and washed on the centrifuge with 3000 parts by weight of a 35% aqueous calcium chloride solution at 15° C., to which have been added 6 parts by weight of the sodium salt of an alkylbenzolsulfonic acid, and with 5000 parts by weight of water. The filter cake is washed with 5000 parts by weight of a 3% aqueous sodium hydroxide solution, to which are added 10 parts by weight of the sodium salt of an alkylbenzolsulfonic acid and stirred at 30° C. for one hour. The polymerisate is separated on a second centrifuge and washed with 3000 parts by weight of a 3% aqueous sodium hydroxide solution and then with 5000 parts by weight of water. One obtains a polyethylene with an ash content of 0.04%.

Example 7

One polymerises 2000 parts by weight of ethylene in 10,000 parts by weight of a hexane-heptane mixture in the presence of 20 parts by weight of titanium tetrachloride and 14 parts by weight of diethylaluminum-monochloride at a temperature of 65° C. and a pressure of 1.3 absolute atmospheres. After conclusion of the polymerisation one cools the polyethylene suspension to 20° C. and adds 5000 parts by weight of a 20% aqueous sodium sulfate solution at 25° C., to which have been added 5 parts by weight of an ethoxylated dodecylphenol, with stirring. After a stirring period of 2 hours the polymerisate is separated from hydrocarbon and the washing solution on a centrifuge, and washed on the centrifuge with 3000 parts by weight of the 20% aqueous sodium sulfate solution, to which have been added 3 parts by weight of ethoxylated dodecylphenol. The filter cake is washed with 10,000 parts by weight of a 5% aqueous sodium hydroxide solution, to which are added 20 parts by weight of ethoxylated dodecylphenol, and stirred for two hours at 40° C. Then the polymerisate is separated on a second centrifuge and washed on the centrifuge with 2000 parts by weight of 5% aqueous sodium hydroxide solution and 5000 parts by weight of water. One obtains a polyethylene with an ash content of 0.02%.

Example 8

The suspension of crude low pressure polyethylene in a hexane-heptane mixture obtained according to the directions of Example 7 is separated into polyethylene and the hexane-heptane mixture on a filter. The filter cake is washed with 10,000 parts by weight of a 25% aqueous magnesium sulfate solution at 15° C. to which are added 10 parts by weight of an ethoxylated cetylphenol, and stirred vigorously for two hours. Then the polymerisate is separated on a centrifuge and washed with 4000 parts by weight of a 25% aqueous magnesium sulfate solution, to which have been added 4 parts by weights of ethoxylated cetyl phenol, and then with 5000 parts by weight of water. The filter cake is washed with 10,000 parts by weight of a 5% aqueous sodium hydroxide solution, to which have been added 20 parts by weight of ethoxylated cetylphenol, and stirred for one hour at 50° C. The polymerisate is separated on a second centrifuge and washed with 5000 parts by weight of a 5% aqueous sodium hydroxide solution, to which have been added 5 parts by weight of the ethoxylated cetylphenol, and then washed with 10,000 parts by weight of water. One obtains a polyethylene with an ash content of 0.03%.

We claim:

1. Process for the purification of a low pressure polyolefine selected from the group consisting of polyethylene and polypropylene containing a catalyst selected from the group consisting of mixtures of organometallic compounds of aluminum with titanium chlorides which comprises washing the polyolefine at from +5 to +30° C. with a 15 to 40% aqueous solution of a readily soluble salt of a strong base and a strong acid, selected from the group consisting of the alkaline earth metal chlorides and bromides and the alkali metal, magnesium and ammonium chlorides, bromides and sulfates, separating the washed polyolefine from the washing solution, rewashing the separated polyolefine with an additional quantity of said aqueous salt solution, separating the polyolefine from the washing solution, washing the separated polyolefine with a 3–10% aqueous solution of sodium hydroxide, separating the polyolefine from said sodium hydroxide solution and washing it with water.

2. Process as defined in claim 1 in which the consumed aqueous salt solution is heated to a temperature of 60 to 100° C., the titanium hydroxide formed is filtered off, then the filtered solution is neutralized and cooled to a temperature of 5 to 25° C. and used again in the process.

3. Process as defined in claim 1 in which at least one of the washing liquids contains a surface active agent selected from the group consisting of ethoxylated fatty alcohols, ethoxylated alkylphenols and alkylarylsulfonates.

References Cited in the file of this patent

UNITED STATES PATENTS

| | | |
|---|---|---|
| 2,838,477 | Roelen et al. | June 10, 1958 |
| 2,868,772 | Ray et al. | Jan. 13, 1959 |
| 2,886,561 | Reynolds et al. | May 12, 1959 |

FOREIGN PATENTS

| | | |
|---|---|---|
| 553,621 | Italy | Apr. 4, 1956 |
| 1,017,368 | Germany | Oct. 10, 1957 |